United States Patent
Robertson et al.

(10) Patent No.: US 9,334,060 B2
(45) Date of Patent: May 10, 2016

(54) INFRARED SUPPRESSING EXHAUST SYSTEM

(71) Applicant: Bell Helicopter Textron Inc., Fort Worth, TX (US)

(72) Inventors: Daniel B. Robertson, Southlake, TX (US); Dudley E. Smith, Arlington, TX (US); Robert M. Laramee, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 429 days.

(21) Appl. No.: 13/624,465

(22) Filed: Sep. 21, 2012

(65) Prior Publication Data

US 2014/0084080 A1    Mar. 27, 2014

(51) Int. Cl.

| | |
|---|---|
| *F02K 1/82* | (2006.01) |
| *F02C 7/24* | (2006.01) |
| *B64C 29/00* | (2006.01) |
| *F01D 25/30* | (2006.01) |
| *F02K 1/46* | (2006.01) |
| *F02K 1/34* | (2006.01) |

(52) U.S. Cl.
CPC ............ *B64D 33/06* (2013.01); *B64C 29/0033* (2013.01); *F01D 25/30* (2013.01); *F02C 7/24* (2013.01); *F02K 1/46* (2013.01); *F02K 1/825* (2013.01)

(58) Field of Classification Search
CPC combination set(s) only.
See application file for complete search history.

(56) References Cited

U.S. PATENT DOCUMENTS

| | | | |
|---|---|---|---|
| 3,210,934 A | 10/1965 | Smale | |
| 3,970,252 A | 7/1976 | Smale et al. | |
| 3,981,143 A | 9/1976 | Ross et al. | |
| 3,981,448 A | 9/1976 | Demogenes et al. | |
| 4,002,024 A | 1/1977 | Nye et al. | |
| 4,044,555 A | 8/1977 | McLoughlin et al. | |
| 4,099,375 A * | 7/1978 | Inglee ................... | F01N 13/082 |
| | | | 60/39.5 |
| 4,136,518 A | 1/1979 | Hurley et al. | |
| 4,214,441 A * | 7/1980 | Mouritsen et al. ............... | 60/262 |

(Continued)

FOREIGN PATENT DOCUMENTS

| | | |
|---|---|---|
| EP | 2452873 A2 | 5/2012 |
| FR | 2785643 A1 | 5/2000 |
| GB | 2034414 A | 6/1980 |

(Continued)

OTHER PUBLICATIONS

Communication from a Counter-Part Application; Extended European Search Report; European Application No. EP 12190299.3; May 6, 2013; 14 pgs.

(Continued)

*Primary Examiner* — Ehub Gartenberg
*Assistant Examiner* — Jared W Pike
(74) *Attorney, Agent, or Firm* — Fish & Richardson P.C.

(57) ABSTRACT

A method of managing aircraft exhaust includes providing hot air at a hot air mass flow rate, providing cold air at a cold air mass flow rate, and mixing the hot air and the cold air at a variable hot air mass flow rate to cold air mass flow rate ratio, wherein the variable hot air mass flow rate to cold air mass flow rate ratio is selectively maintained independent of at least one of (1) a variation in the hot air mass flow rate and (2) a variation in a translational speed of the aircraft.

18 Claims, 13 Drawing Sheets

(56) References Cited

U.S. PATENT DOCUMENTS

| | | |
|---|---|---|
| 4,215,537 A | 8/1980 | Hurley |
| 4,355,507 A | 10/1982 | Coffey et al. |
| 4,463,653 A | 8/1984 | Pusch et al. |
| 7,731,121 B2 | 6/2010 | Smith et al. |
| 2012/0119017 A1 | 5/2012 | Robertson et al. |

FOREIGN PATENT DOCUMENTS

| | | |
|---|---|---|
| GB | 2176247 A | 12/1986 |
| GB | 2450306 A | 12/2008 |
| WO | 2006049551 A1 | 5/2006 |
| WO | 2012/064345 A1 | 5/2012 |

OTHER PUBLICATIONS

Foreign Communication from a Counter-Part Application, Partial European Search Report; European Application No. EP 12190299.3; Feb. 27, 2013; 6 pages.

Birk, A.M., et al., "Suppressing the Infra-Red Signatures of Marine Gas Turbines," The American Society of Mechanical Engineers, Gas Turbine and Aeroengine Congress and Exposition, 88-GT-3, Jun. 5-9, 1988, Amsterdam, The Netherlands, 10 pages.

Bubb, James V., "The Influence of Pressure Ratio on Film Cooling Performance of a Turbine Blade," Thesis submitted to the Faculty of the Virginia Polytechnic Institute and State University, Jul. 1999, Blacksburg, Virginia, 205 pages.

Harmonic Drive AG, "TorkDrive—Harmonic Drive Torque Motors," Product Brochure, Sep. 2009, 16 pages.

\* cited by examiner

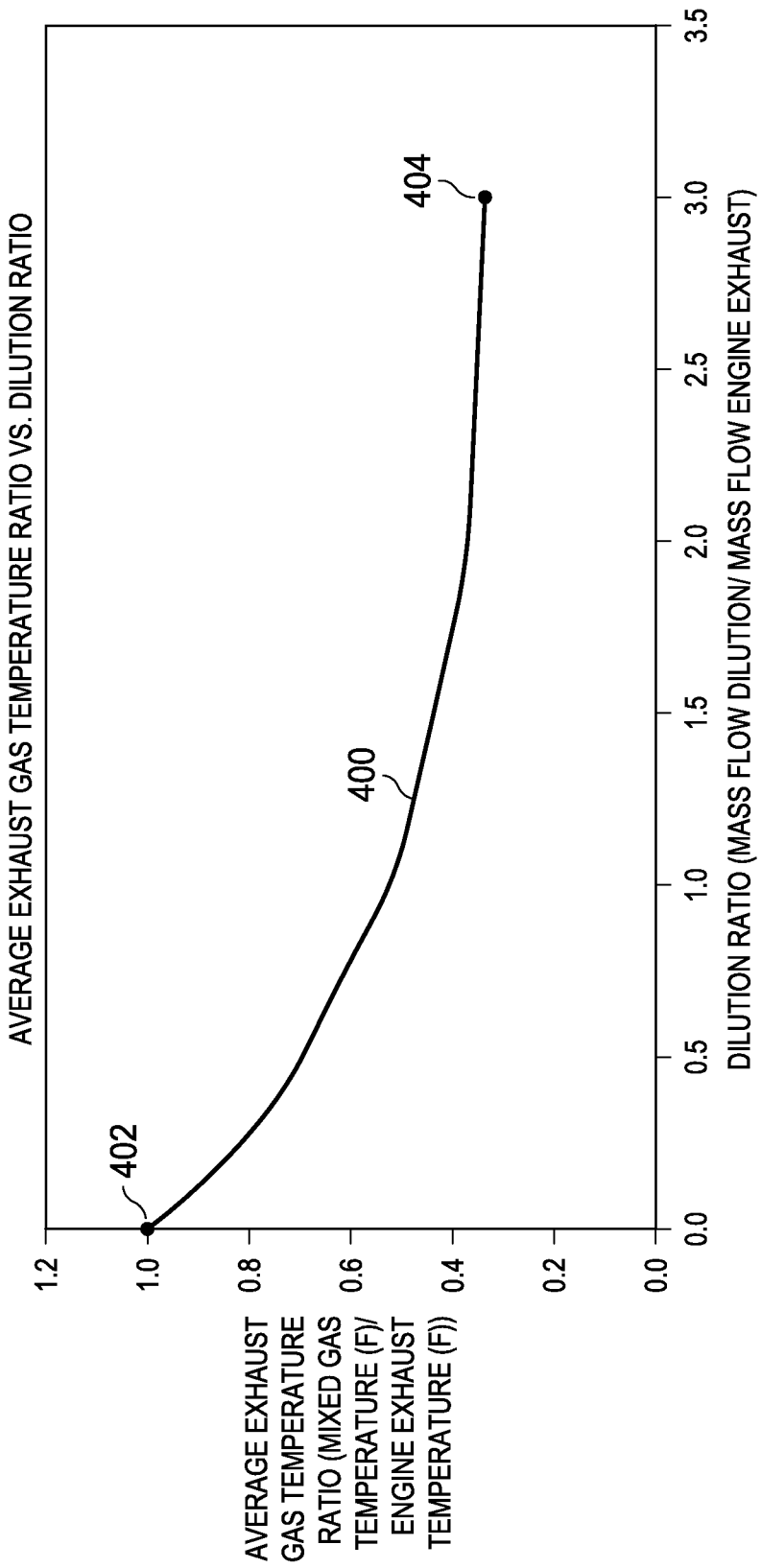

INFRARED SUPPRESSING EXHAUST SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Exhaust systems, such as those associated with aircraft, may expel exhaust at undesirably high temperatures and/or may provide line of sight viewing of components that are heated to an undesirably high temperature. In some cases, the excessive temperatures may contribute to an undesirable heat signature perceptible by heat based sensing devices. In some cases, undesirably high temperature exhaust may contribute to undesired heating and/or scorching of a landing surface.

SUMMARY

In some embodiments of the disclosure, a method of managing aircraft exhaust is provided that comprises providing hot air at a hot air mass flow rate, providing cold air at a cold air mass flow rate, and mixing the hot air and the cold air at a variable hot air mass flow rate to cold air mass flow rate ratio, wherein the variable hot air mass flow rate to cold air mass flow rate ratio is selectively maintained independent of at least one of (1) a variation in the hot air mass flow rate and (2) a variation in a translational speed of the aircraft.

In other embodiments of the disclosure, an exhaust system is disclosed as comprising a mixer duct comprising a mixer duct internal space at least partially bounded by a mixer duct wall, a distributor at least partially disposed within the mixer duct internal space, the distributor comprising a distributor internal space at least partially bounded by a distributor wall and at least one distributor perforation through the distributor wall, the distributor perforation being configured to join the distributor internal space with the space between the mixer duct wall and the distributor wall in fluid communication, and an exhaust system controller configured to selectively affect a first air mass flow rate through the space between the mixer duct wall and the distributor wall.

In yet other embodiments of the disclosure, an exhaust system is disclosed as comprising a hot air source configured to selectively provide the exhaust system with air comprising a hot air temperature at a hot air mass flow rate and an exhaust system controller configured to selectively provide the exhaust system with air having a cold air temperature and a variable cold air mass flow rate, wherein the cold air temperature is less than the hot air temperature, and wherein the cold air controller is configured to selectively achieve a selected cold air mass flow rate independent of the hot air mass flow rate.

BRIEF DESCRIPTION OF THE DRAWINGS

For a more complete understanding of the present disclosure and the advantages thereof, reference is now made to the following brief description, taken in connection with the accompanying drawings and detailed description:

FIG. 19 is a graph showing a curve of an average exhaust gas temperature ratio vs. a dilution ratio associated with operation of an embodiment of an exhaust system of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to provide an exhaust system that provides a variable ratio of cold air mass flow rate to hot air mass flow rate that is selectively variable selectively independent of engine speed, vehicle speed, and/or direction of expelled exhaust. In some embodiments of the disclosure, an exhaust system is provided that supplies an interior space of a distributor with an independently variable mass flow rate of cold air. In some embodiments of the disclosure, an exhaust system is provided that additionally supplies an independently variable mass flow rate of cold air into a space associated with an exterior of the above-mentioned distributor. In some embodiments of the disclosure, the mass flow rate of cold air supplied to the interior space of the distributor and/or the mass flow rate of cold air supplied to the space associated with the exterior of the distributor may be varied to mix with hot air supplied to the exhaust system to achieve a desired expelled exhaust temperature and/or a desired temperature of a component of the exhaust system. Such a reduction in temperature may substantially reduce and/or eliminate an infrared detectability of an aircraft 100 employing the presently disclosed exhaust system.

Figure 1A:
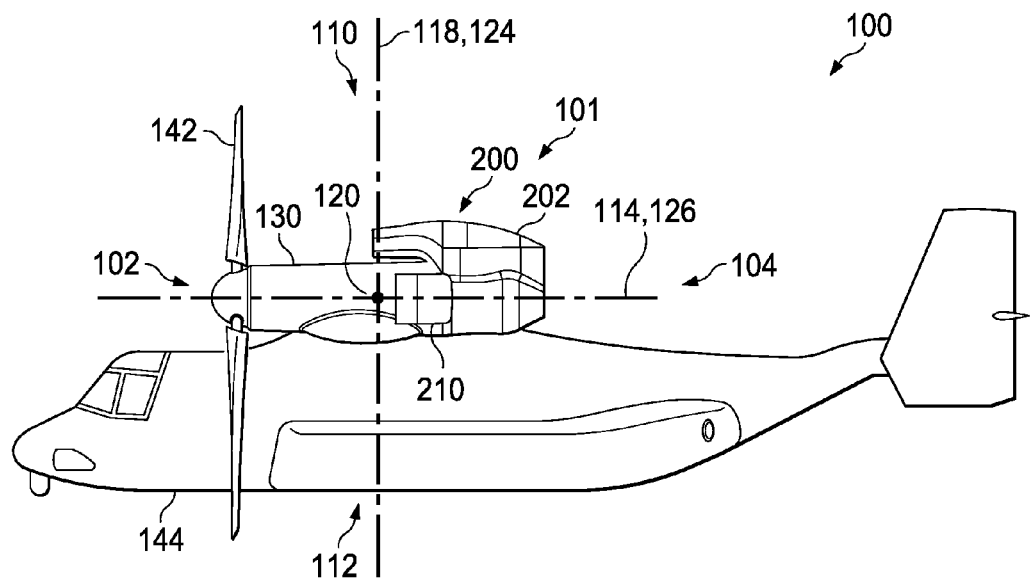
FIGS. 1A and 1B are orthogonal right side views of an aircraft comprising an exhaust system according to an embodiment of the disclosure with the aircraft shown in an airplane mode and a hovering mode, respectively.
Figure 1B:
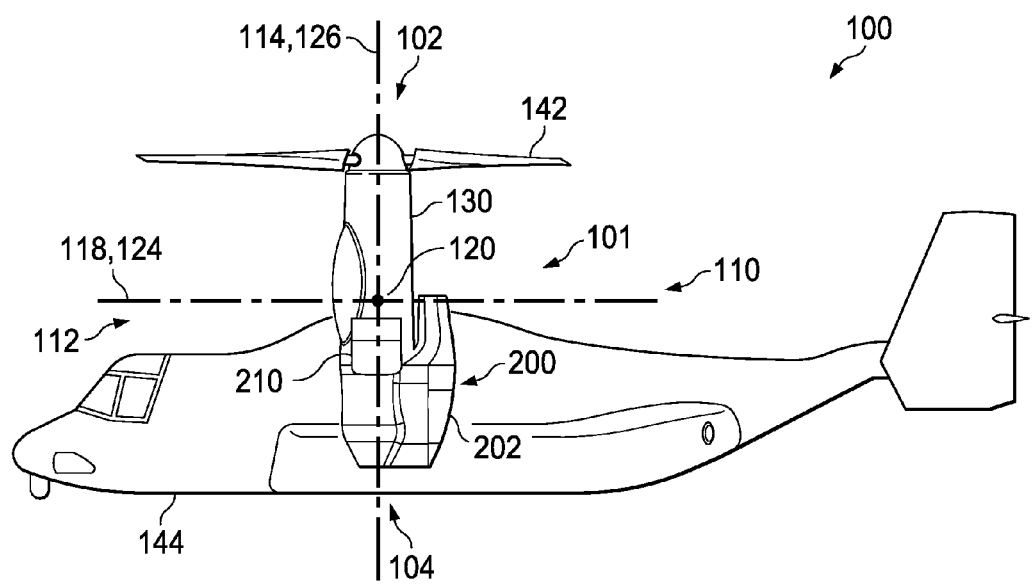

Referring to FIGS. 1A and 1B, an orthogonal right side view of an aircraft 100 according to an embodiment of the disclosure is shown. The aircraft 100 generally comprises nacelles 101 which carry rotors 142. In this embodiment, the nacelles 101 are supported by wings that are carried by a fuselage 144. FIG. 1A shows the aircraft 100 in an airplane mode while FIG. 1B shows the aircraft 100 in a hovering mode, with the modes being at least partially defined by an orientation of the nacelles 101 relative to the ground and/or a remainder of the aircraft 100.

Referring to FIGS. 2-7, a portion of an aircraft 100 according to an embodiment of the disclosure is shown. In this embodiment, the portion of the aircraft 100 shown may be referred to as the nacelle 101. Nacelle 101 may be described as generally comprising a front 102, rear 104, left 106, right 108, top 110, and bottom 112 and the following description and associated drawings may generally utilize directional indications to assist in identifying the directional orientation of the nacelle 101 and/or components of the nacelle 101 without the requirement that such an indication is an absolute identification of a directional extent of the nacelle 101. In other words, the above described directional indications are intended to generally clarify orientations of the components of the nacelle 101 relative to each other and to provide context to the associated figures, not limit the claims. Because the nacelle 101 is rotatable relative to the remainder of the aircraft, it is important to note that the same directional indicators while utilized in the discussion and associated figures that comprise the components of the nacelle 101 to provide a consistent frame of reference throughout the disclosure for the nacelle 101 components. However, it should further be noted that the aircraft 100 may comprise other traditional axes and coordinate systems that are sometimes inconsistent with the nacelle 101 directional conventions above as a function of the nacelle 101 being rotatable relative to the remainder of the aircraft 100.

The nacelle 101 further comprises a longitudinal axis 114, a lateral axis 116, and a vertical axis 118. The longitudinal axis 114 generally extends longitudinally in a front-rear direction relative to the nacelle 101. The lateral axis 116 generally extends laterally in a left-right direction relative to the nacelle 101. The vertical axis 118 generally extends vertically in a top-bottom direction relative to the nacelle 101. The longitudinal axis 114, lateral axis 116, and vertical axis 118 intersect each other at an origin 120 and may generally be described as defining a three dimensional Cartesian coordinate system. The nacelle 101 further comprises a lateral bisection plane 122, a longitudinal bisection plane 124, and a vertical bisection plane 126. The lateral bisection plane 122 is generally coincident with the lateral axis 116 and the vertical axis 118. The longitudinal bisection plane 124 is generally coincident with the longitudinal axis 114 and the vertical axis 118. The vertical bisection plane 126 is generally coincident with the lateral axis 116 and longitudinal axis 114.

While the axes 114, 116, and 118 and bisection planes 122, 124, and 126 are generally defined to facilitate discussion of the nacelle 101, the location of the origin 120 relative to the nacelle 101 and the orientation of the axes 114, 116, and 118 relative to the nacelle 101 and/or to a primary direction of forward movement of the aircraft 100 may be described differently without impact to the functionality of the aircraft 100, the nacelle 101, and/or the components of the nacelle 101 disclosed herein. In other words, unless otherwise noted herein, the defined orientations of the axes 114, 116, and 118 and bisection planes 122, 124, and 126 are provided as a frame of reference against which the nacelle 101 and the components of the nacelle 101 may be consistently described.

Still referring now to FIGS. 2-5 an oblique top-front view, an oblique top-rear view, an orthogonal front view, and an orthogonal rear view, respectively, of a portion of the aircraft 100 are shown. Also referring to FIG. 6 and FIG. 7, an oblique top-front view of the portion of the aircraft 100 of FIGS. 2-5 with a power cowling removed and an oblique top-front view of the exhaust system 200 of the portion of the aircraft 100 of FIGS. 2-5 are shown, respectively. The aircraft 100 generally comprises a power system 128 and an exhaust system 200. In this embodiment, the power system 128 comprises a power cowling 130 configured to substantially envelope about the longitudinal axis 114 both an engine 132, such as a turbine engine (see FIG. 6), and a transmission 134 that may be selectively driven by the engine 132. While the engine 132 and the transmission 134 are depicted with specificity, in alternative embodiments, the engine 132 and the transmission 134 may be differently shaped and/or located differently relative to each other. Regardless of the details of the engine 132 and the transmission 134, the power system 128 comprises a power inlet 136 configured to receive cold air into the power cowling 130 and a power outlet 138 (See FIGS. 16-18) configured to expel hot air from the power cowling 130. In some cases, a mass flow rate of air passing through the power system 128 may be a function of at least one of a speed at which the engine 132 is operated and a speed at which the aircraft 100 and/or the power system 128 move relative to ambient air. Throughout this disclosure, unless specified otherwise, "hot air" refers to air comprising a temperature relatively higher than ambient air and which was increased in temperature primarily as a function of operation of the power system 128. Similarly, unless specified otherwise, "cold air" refers to air comprising a temperature less than a temperature of the hot air and may include ambient air, air heated by aircraft 100 components other than power system 128, and/or refrigerated air that may be cooler than ambient air. Most generally, the power system 128 is configured to selectively feed hot air to the exhaust system 200 during operation of the engine 132. In some embodiments, hot air may comprise a temperature equal to about an ambient environment temperature (having a value between of about −130° F. to about 140° F. at engine startup) to about 2,000° F.

Still referring to FIGS. 2-7, the exhaust system 200 comprise an exhaust cowling 202, a mixer duct 204, a distributor 206, a cavity supply duct 208, and a surface supply duct 210. The exhaust system 200 further comprises a cavity fan 212 associated with the cavity supply duct 208 and configured to be selectively controlled by a cavity fan controller 214 and a surface fan 216 associated with the surface supply duct 210 and configured to be selectively controlled by a surface fan controller 218. In some embodiments, a pitch of one or more blades of the cavity fan 212 may be selectively changed to affect an air mass flow rate generated by the cavity fan 212.

Most generally, the exhaust cowling 202 is configured for attachment to the power cowling 130 so that the power outlet 138 is generally upstream of the exhaust system 200. As will be explained in detail below, ambient air may enter and exit the power system 128 at a mass flow rate substantially attributable to a speed of operation of the engine 132 and/or a translational speed of the power cowling 130 relative to the ambient air. Hot air exiting the power system 128 may be received by the exhaust system 200 at a hot air mass flow rate. Most generally, the exhaust system 200 may mix the hot air with cold air supplied to the exhaust system 200 via one or both of the cavity supply duct 208 and the surface supply duct 210. In this embodiment, the cold air mass flow rates through each of the cavity supply duct 208 and the surface supply duct 210 may be at least partially attributable to a translational speed of the cavity supply duct 208 and the surface supply duct 210 relative to the ambient air, respectively. However, in much the same manner the engine 132 may be controlled to various speed to affect a hot air mass flow rate, the cold air mass flow rates associated with the cavity supply duct 208 and the surface supply duct 210 may be controlled by operating the cavity fan controller 214 and the surface fan controller 218 to operate the cavity fan 212 and the surface fan 216 at selected speeds, respectively, and/or to maintain selected cold air mass flow rates.

In some embodiments, the exhaust system 200 comprises an exhaust system controller 215 (see FIG. 6) that may be in bidirectional communication with each of the cavity fan controller 214 and the surface fan controller 218. The exhaust system controller 215 may comprise temperature sensors, pressure sensors, air flow sensors, and/or any other suitable and/or necessary sensors for monitoring and/or controlling the operation of the exhaust system 200. The exhaust system controller 215 may be configured to control one or more air temperatures and/or surface temperatures to a desired and/or predetermined temperature. For example, in some embodiments, the exhaust system controller 215 may cause at least one of the cavity fan controller 214 and the surface fan controller 218 to increase a delivery of cold air to counter an increase in a temperature of the hot air received into the exhaust system 200. It will be appreciated that to the extent that the exhaust system 200 comprises multiple sources of cold air and/or multiple sources of hot air, the exhaust system controller 215 may be configured to manage operation of the exhaust system 200 to maintain selected air temperatures and/or surface temperatures independent of the speed of the engine 132, independent of the speed of the aircraft 100 and/or components of the aircraft 100, and/or in response to a change in a threat condition.

Figure 8:
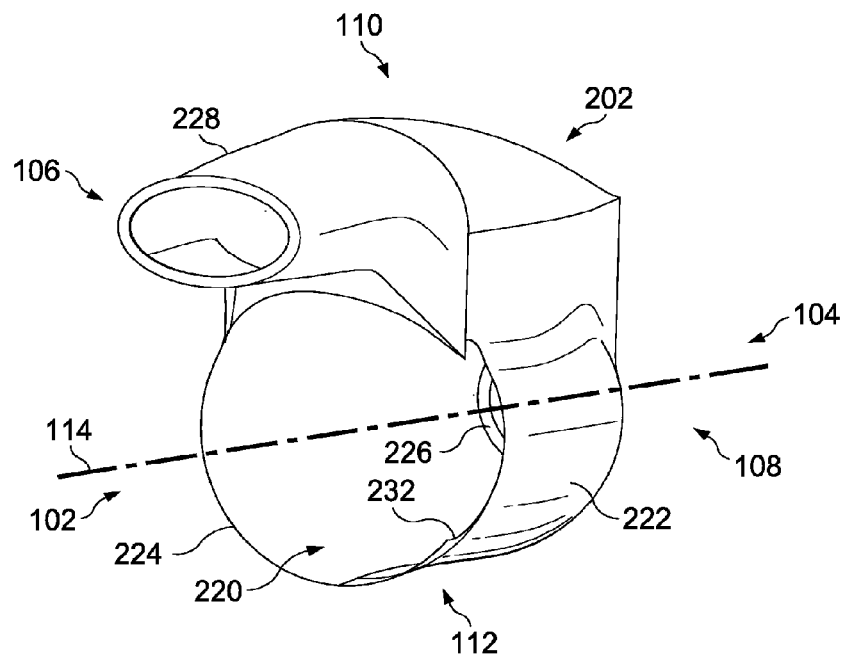
FIG. 8 is an oblique front-top view of an exhaust cowling of the exhaust system of FIG. 2.

Referring now to FIG. 8, an oblique front-top view of an exhaust cowling 202 is shown. The exhaust cowling 202 generally comprises an exhaust cowling interior space 220 substantially bounded about the longitudinal axis 114 by an exhaust cowling wall 222 that generally longitudinally terminates at an exhaust cowling inlet 224 and an exhaust cowling outlet 226. The exhaust cowling 202 further comprises an exhaust cowling tube 228 that extends vertically above and longitudinally forward of the exhaust cowling wall 222. The exhaust cowling 202 further comprises an exhaust cowling wall recess 232 formed in a longitudinally forward portion of the exhaust cowling wall 222.

Figure 9:
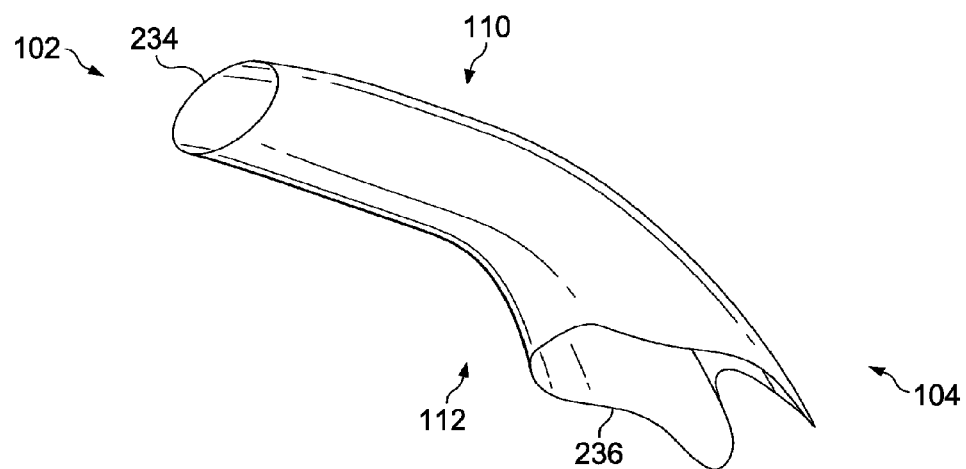
FIG. 9 is an oblique front-bottom view of a cavity supply duct of the exhaust system of FIG. 2.

Referring now to FIG. 9, an oblique front-bottom view of the cavity supply duct 208 is shown. The cavity supply duct 208 generally comprises a tubular structure comprising a cavity supply duct inlet 234 and a cavity supply duct outlet 236. Most generally, the cavity supply duct 208 is configured to be partially received within the exhaust cowling tube 228 so that the cavity supply duct inlet 234 is substantially sealed to a longitudinally forward portion of the exhaust cowling tube 228.

Figure 10:
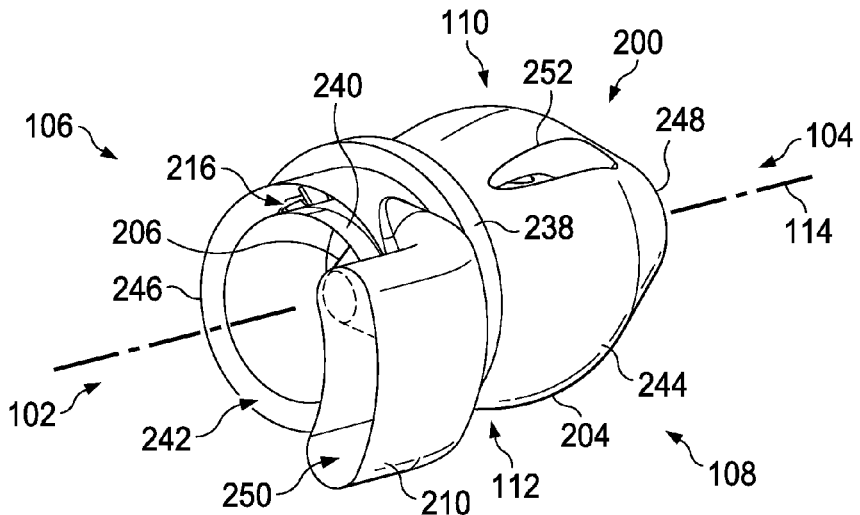
FIG. 10 is an oblique front-top view of a mixer duct and an associated surface fan of the exhaust system of FIG. 2.
Figure 11:
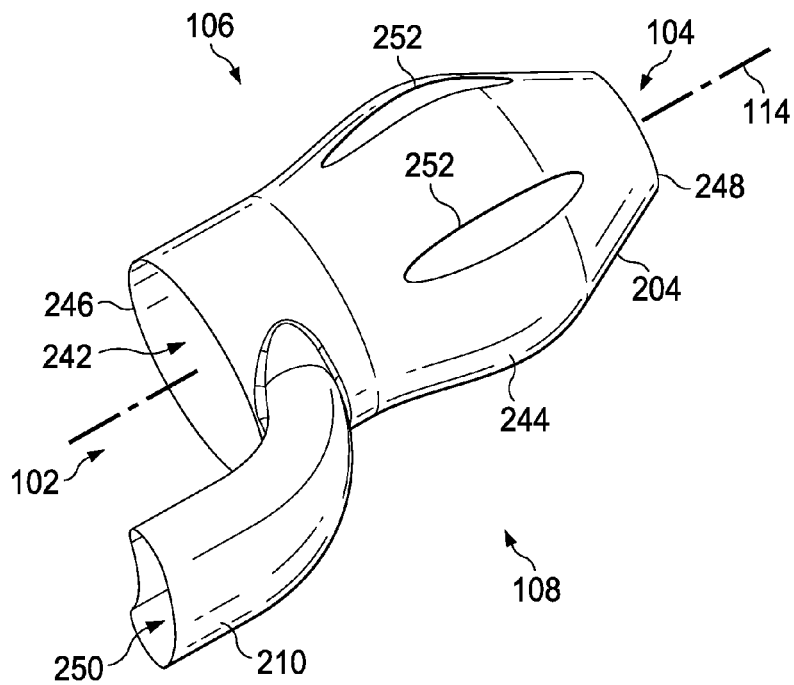
FIG. 11 is an oblique top view of the mixer duct and surface supply duct of FIG. 2.
Figure 12:
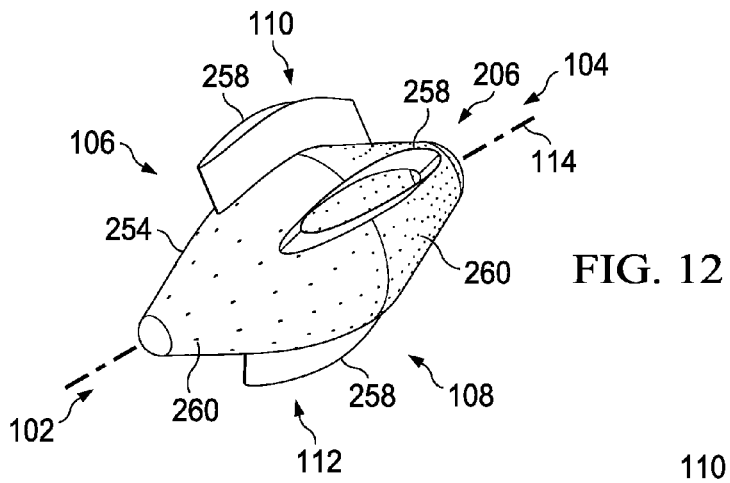
FIG. 12 is an oblique front-top view of a distributor of the exhaust system of FIG. 2.
Figure 13:
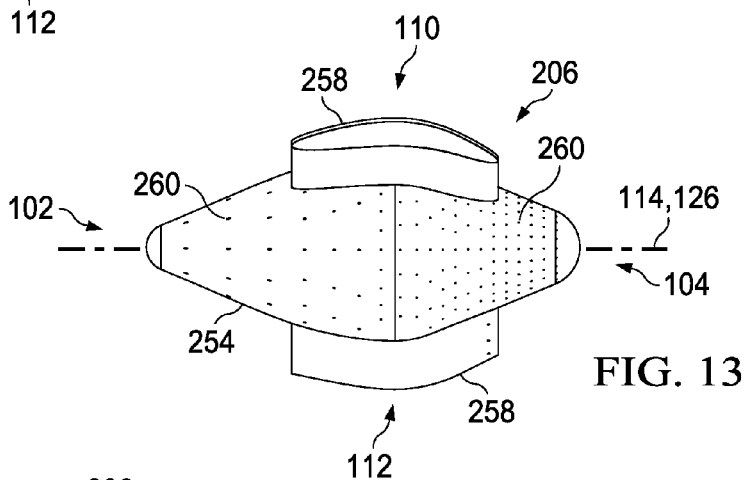
FIG. 13 is an orthogonal right view of the distributor of FIG. 12.
Figure 14:
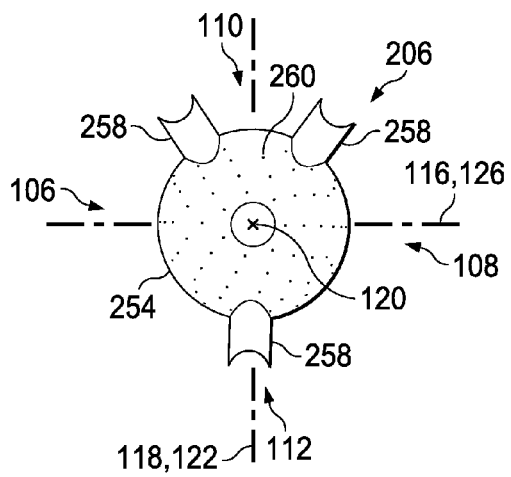
FIG. 14 is an orthogonal front view of the distributor of FIG. 12.
Figure 15:
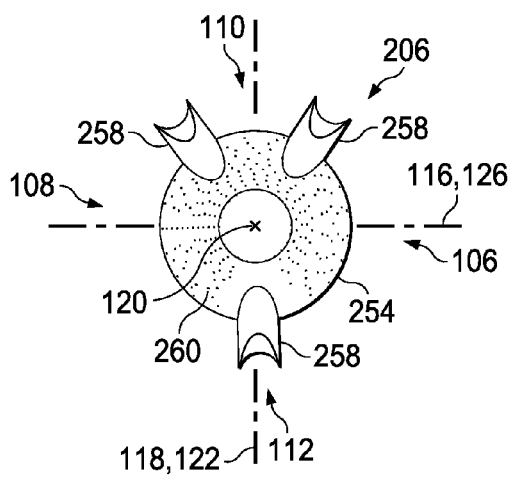
FIG. 15 is an orthogonal rear view of the distributor of FIG. 12.

Referring now to FIGS. 10 and 11, an oblique front-top view of the mixer duct 204 with associated surface supply duct 210 and surface fan 216 and an oblique top view of the mixer duct 204 with the associated surface supply duct 210 are shown, respectively. In this embodiment, the mixer duct 204 and the surface supply duct 210 are constructed as a substantially unitary component. The surface fan 216 comprises an annular motor 238 and a tubular blade assembly 240 configure to be selectively driven by the annular motor 238 and rotated about the longitudinal axis 114. In some embodiments, a pitch of one or more blades of the tubular blade assembly 240 may be selectively changed to affect an air mass flow rate generated by the surface fan 216. In this embodiment, the blades of the tubular blade assembly 240 are upstream of a location at which hot air and cold air are mixed which, in some embodiments, may reduce a pressure drop attributable to the mixing of the hot air and the cold air. In some embodiments, the annular motor 238 may require about 40 HP to reduce the Fahrenheit temperature of air exhausted from the exhaust system 200 by about 50 percent while the aircraft 100 is operating in a hovering configuration such as that shown in FIG. 1B. Of course, there are many variables that may affect the above-described power requirement and the resultant exhaust temperature.

The mixer duct 204 generally comprises a mixer duct interior space 242 substantially bounded about the longitudinal axis 114 by a mixer duct wall 244 that generally longitudinally terminates at a mixer duct inlet 246 and a mixer duct outlet 248. The mixer duct 204 is generally joined to the surface supply duct 210 that extends laterally rightward and longitudinally forward of the mixer duct wall 244 and comprises a surface supply duct interior space 250 in fluid communication with the mixer duct interior space 242. The mixer duct 204 further comprises mixer duct apertures 252 along a top portion of the mixer duct wall 244 for receiving cold air from the cavity supply duct 208. The cavity supply duct outlet 236 is generally shaped complementary to the mixer duct wall 244.

Referring now to FIGS. 12-15, an oblique front-top view, an orthogonal right view, an orthogonal front view, and an orthogonal rear view of the distributor 206 are shown, respectively. The distributor comprises 206 a generally egg-shaped distributor wall 254 generally defining a distributor interior space 256 (see FIGS. 16-18). The distributor interior space 256 is in fluid communication with space exterior to the distributor wall 254 via a plurality of distributor input ducts 258 that are angularly disposed along the distributor wall 254 about the longitudinal axis 114. The distributor interior space 256 is also in fluid communication with space exterior to the distributor wall 254 via a plurality of distributor perforations 260 which may be laser cut into the distributor wall 254 and/or the distributor input ducts 258. One or more of the distributor input ducts 258 may extend toward the cavity supply duct outlet 236 and may be configured to extend through and/or seal against the mixer duct apertures 252. In some embodiments, the distributor perforations 260 may be disposed along the distributor wall 254 along portions of the distributor wall 254 to which air may remain substantially attached during film cooling and/or as a function of a Coanda effect. In other embodiments, additional exhaust system 200 components, such as distributor input ducts 258, may similarly comprise perforations configured to provide skin and/or film cooling.

Figure 2:
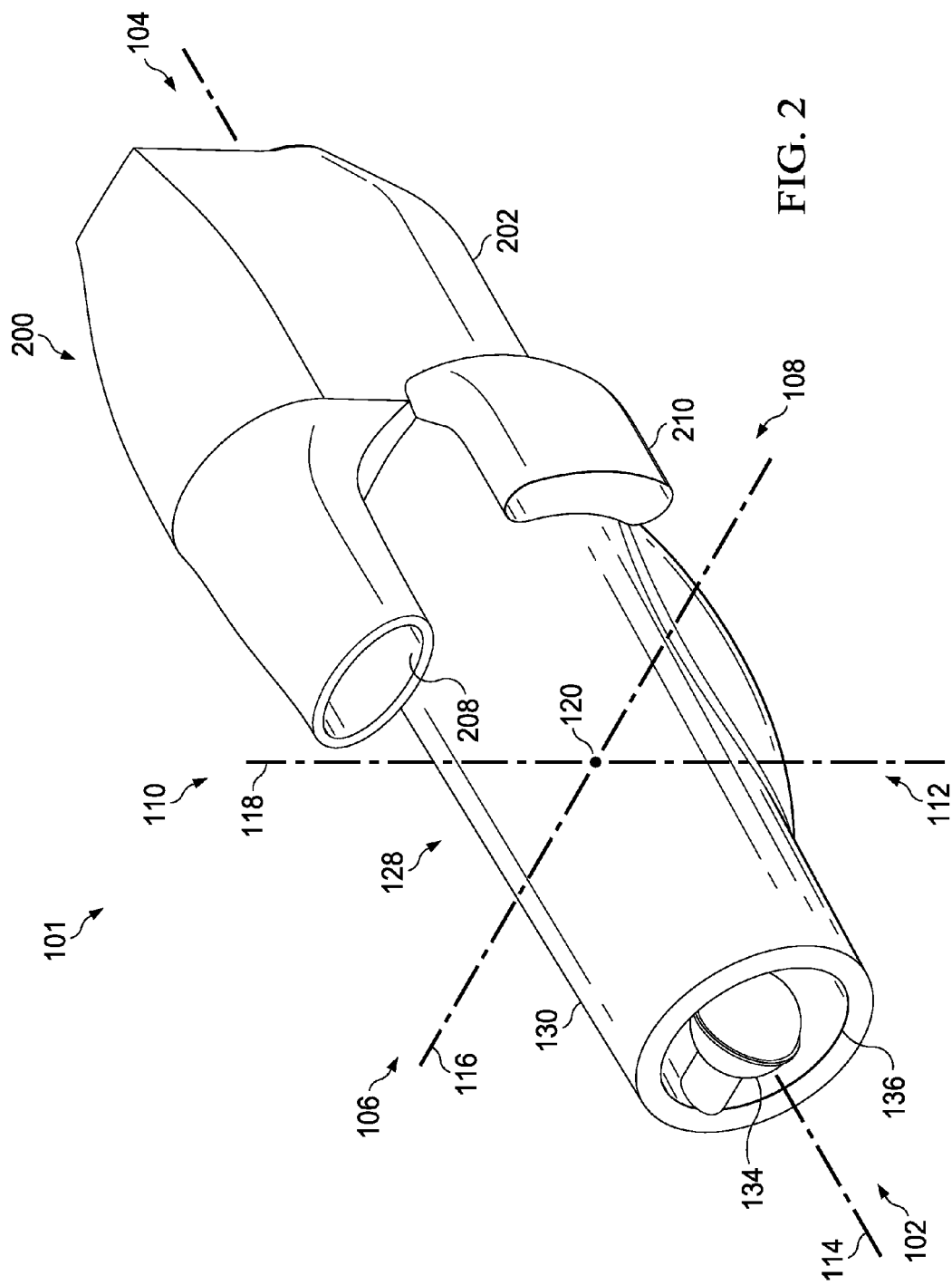
FIG. 2 is an oblique top-front view of a portion of an aircraft comprising an exhaust system according to an embodiment of the disclosure.
Figure 3:
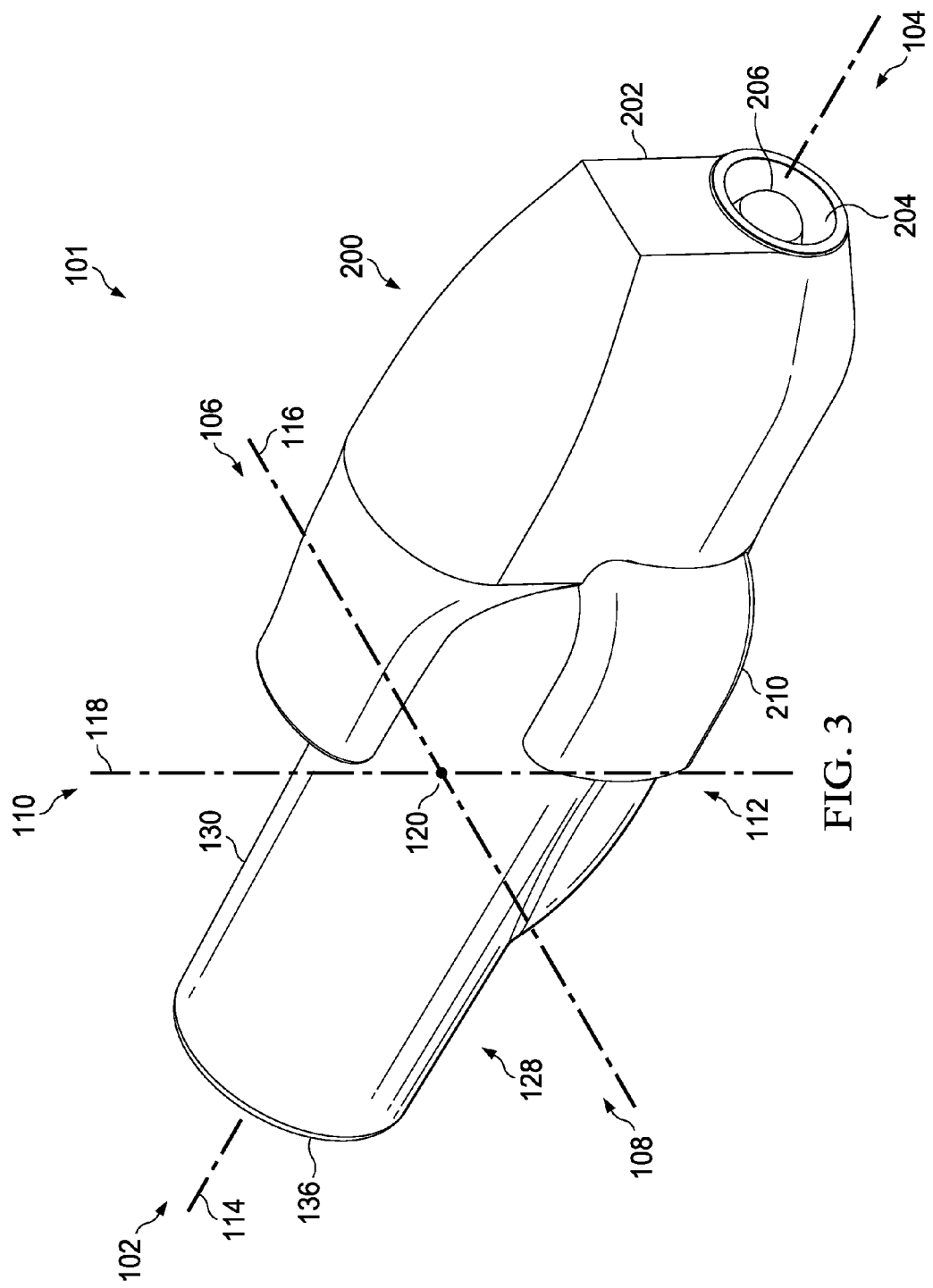
FIG. 3 is an oblique top-rear view of the portion of the aircraft of FIG. 2.
Figure 4:
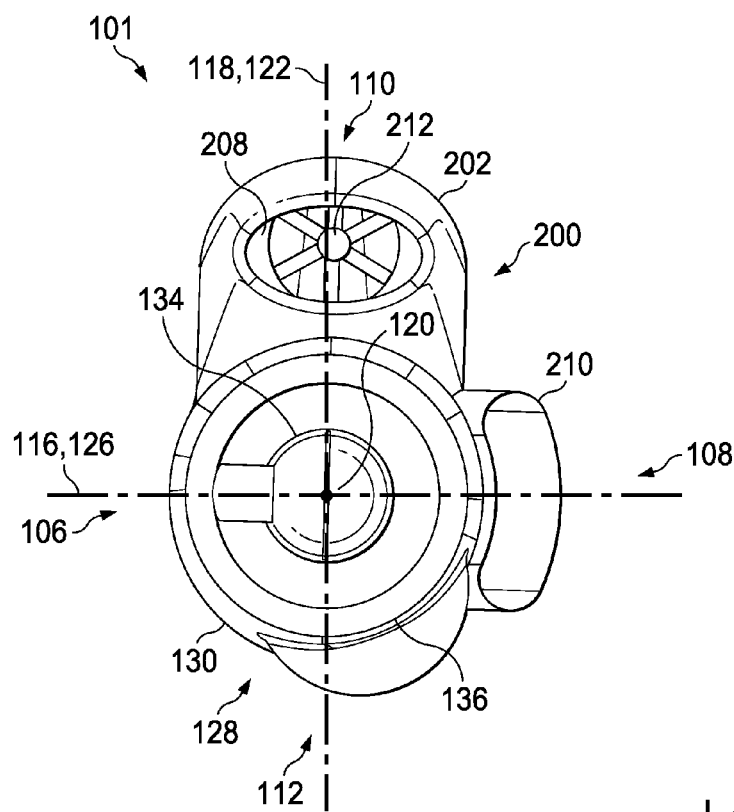
FIG. 4 is an orthogonal front view of a portion of the aircraft of FIG. 2.
Figure 5:
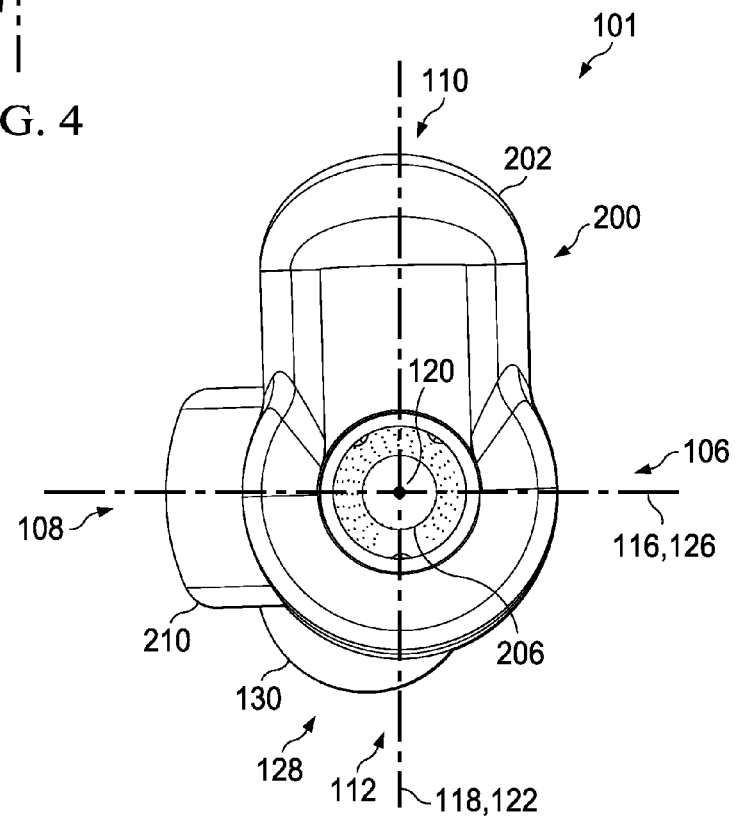
FIG. 5 is an orthogonal rear view of the portion of the aircraft of FIG. 2.
Figure 6:
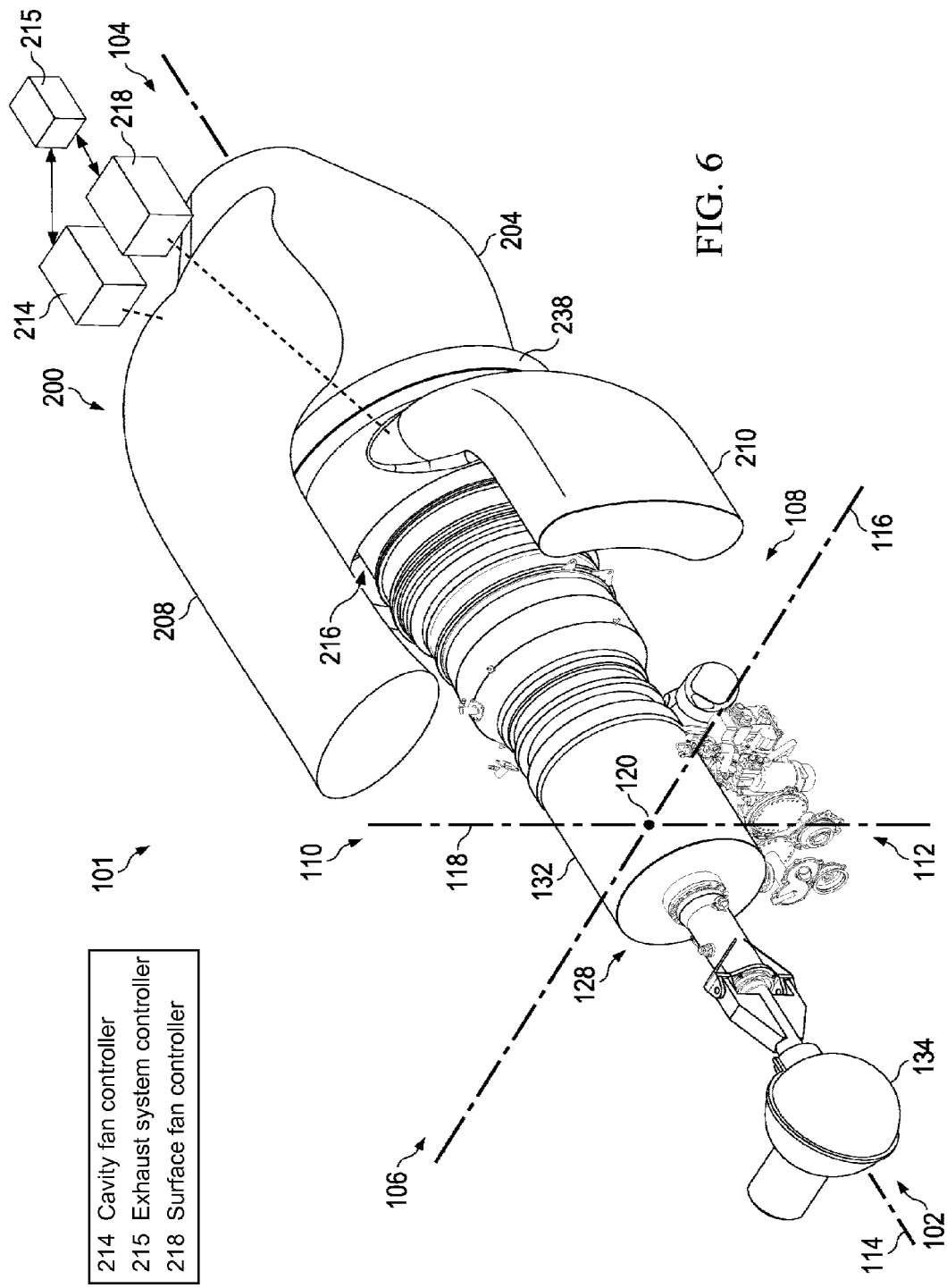
FIG. 6 is an oblique front-top view of the portion of the aircraft of FIG. 2 shown with each of an engine cowling and an exhaust cowling removed.
Figure 7:
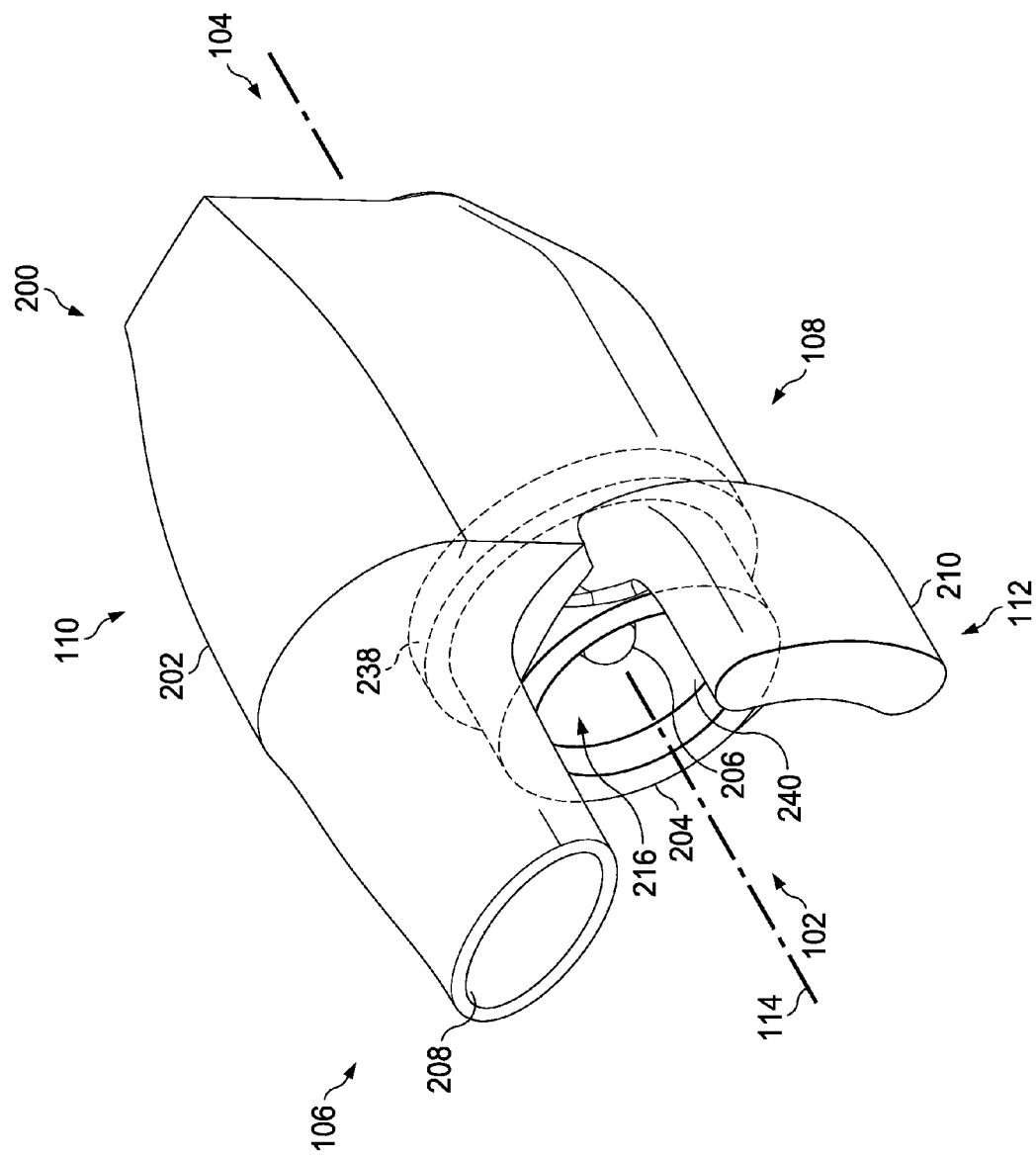
FIG. 7 is an oblique front-top view of the exhaust system of FIG. 2.
Figure 16:
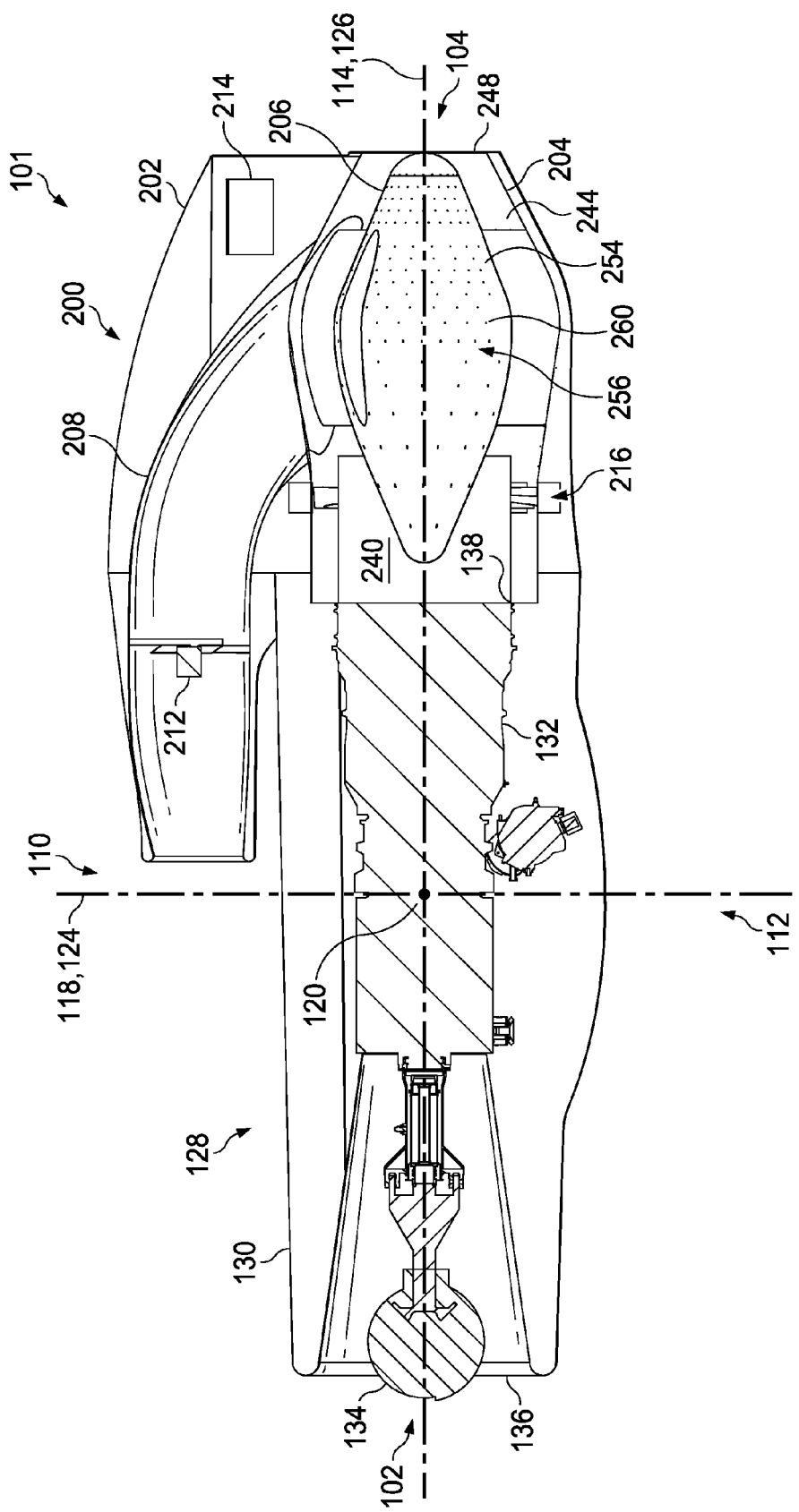
FIG. 16 is an orthogonal right cut-away view of the portion of the aircraft of FIG. 2 cut along a lateral bisection plane.
Figure 17:
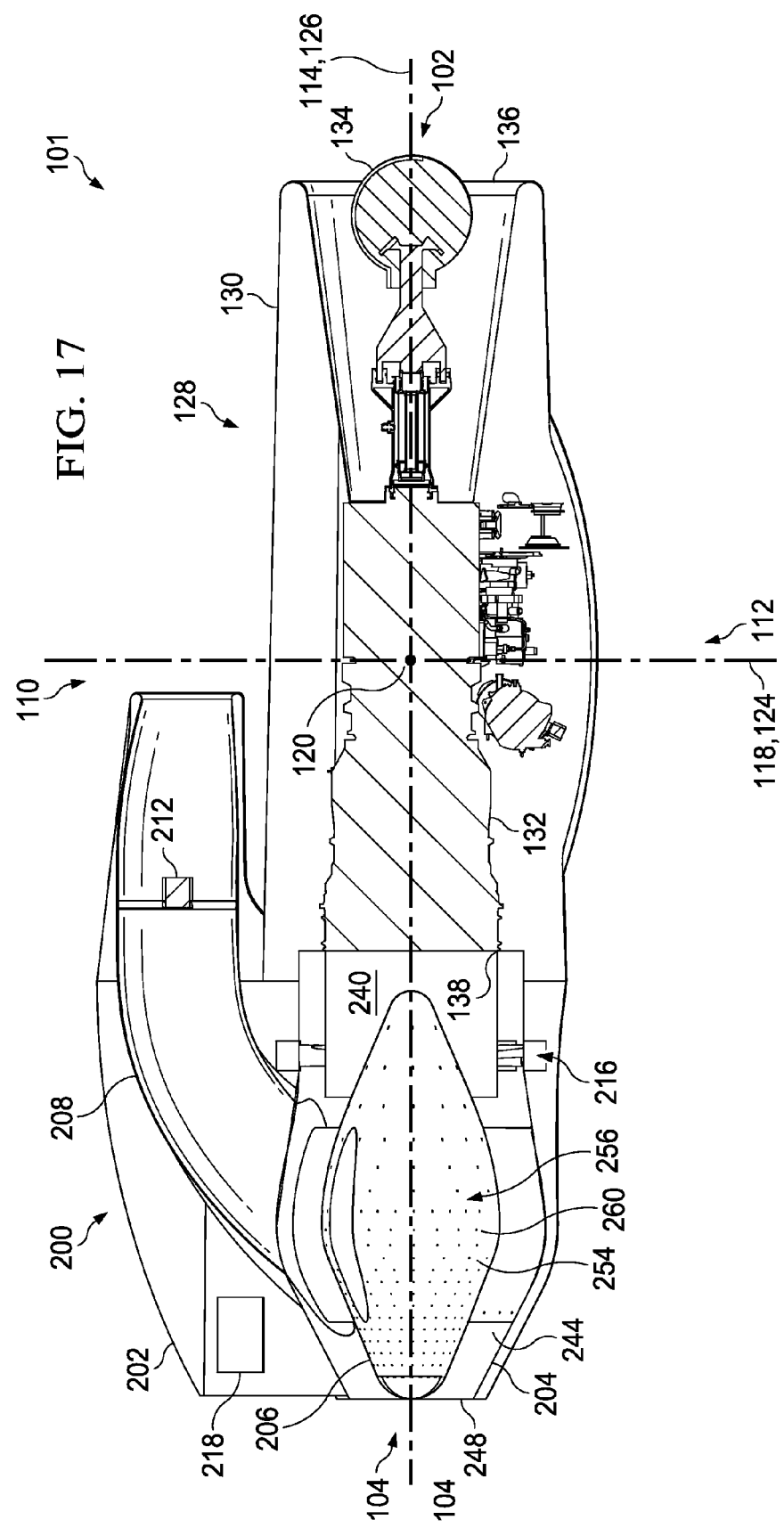
FIG. 17 is an orthogonal left cut-away view of the portion of the aircraft of FIG. 2 cut along the lateral bisection plane of FIG. 16.
Figure 18:
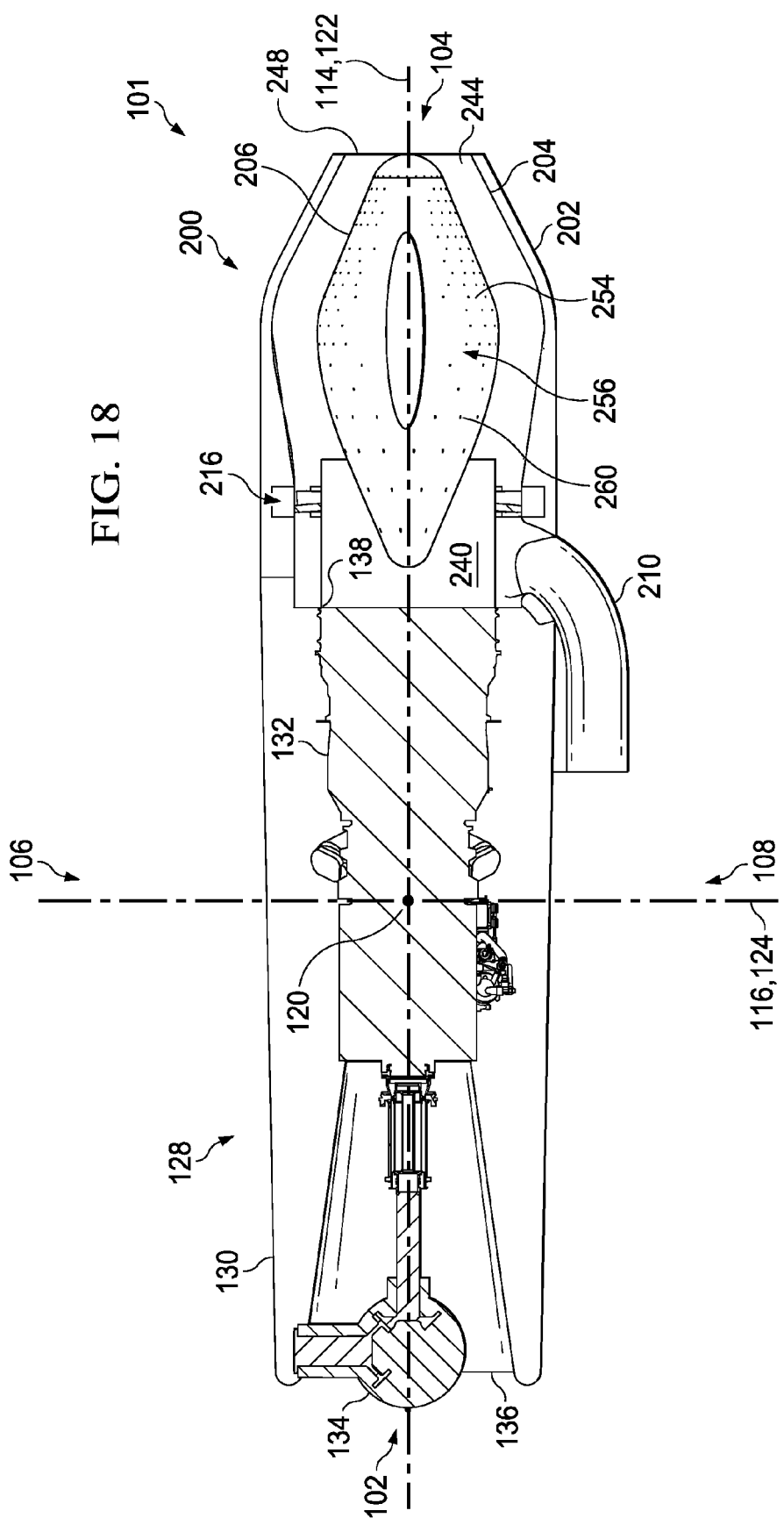
FIG. 18 is an orthogonal top cut-away view of the portion of the aircraft of FIG. 2 cut along a vertical bisection plane.

Referring now to FIGS. 16-18, an orthogonal right cut-away cut along lateral bisection plane 122, an orthogonal left cut-away view cut along the lateral bisection plane 122, and an orthogonal top cut-away view cut along the vertical bisection plane 126, are shown of the portion of the aircraft 100 of FIG. 2, respectively. In operation, a method of managing aircraft 100 exhaust may comprise first operating the engine 132 of the power system 128, thereby pulling ambient air into the power inlet 136 and rejecting hot air out of the power system 128 through power outlet 138 at a hot air mass flow rate.

The hot air may be received into the exhaust system 200 and into the mixer duct interior space 242 within the tubular blade assembly 240 of the surface fan 216. In cases where the aircraft 100 is stationary and neither the cavity fan 212 nor the surface fan 216 are operated, the hot air may generally pass through the space between the distributor wall 254 and the mixer duct wall 244 and flow longitudinally rearward until the hot air exits the exhaust system 200 through the mixer duct outlet 248. In some embodiments, the cavity fan 212 and the surface fan 216 may be operated to introduce cold air into the distributor interior space 256 and the space between the tubular blade assembly 240 and the mixer duct wall 244, respectively. In some cases, the cavity fan controller 218 may control the cavity fan 212 to supply cold air to the distributor interior space 256 at a pressure sufficient to force cold air through at least one of the distributor perforations 260. By flowing cold air from the distributor perforations 260 while hot air and/or cold air passes longitudinally over the exterior of the distributor wall 254, film cooling may be achieved. Additionally, the surface fan controller 218 may be operated to control the surface fan 216 to induce cold air through the surface supply duct 210 and become entrained in the longitudinal air flow prior to entering the space between the distributor wall 254 and the mixer duct wall 244.

In some embodiments, utilizing one or more of the above-described cavity fan 212 and surface fan 216 to selectively supply cold air for mixing with hot air may provide an ability to select, achieve, and/or maintain a selected cold air mass flow rate to hot air mass flow rate ratio regardless of the translational speed of the aircraft, regardless of the orientation of the exhaust system 200 relative to a landing surface, and/or regardless of an engine 132 speed. While ducts and fans are disclosed above as providing the ability to selectively vary the cold air mass flow rate, in alternative embodiments, one or more of the exhaust system 200 components may be configured to provide a variable orifice and/or cross sectional area to alter pressures and/or mass flow rates through the variable orifice and/or cross-sectional area. Such variations in orifices, cross-sectional areas, and/or the cold air mass flow rate may affect an aerodynamic resistance to movement of the aircraft 100. For example, in some cases, selectively reducing an amount of cold air routed through the exhaust system 200, reducing an orifice size, reducing a cross-sectional flow area, and/or reducing a size of an external surface area of the exhaust system may selectively reduce an amount of power required to move the aircraft 100 during flight, such as flight while the aircraft 100 is in the airplane mode shown in FIG. 1A.

The above-disclosed exhaust system 200 is configured to specifically prevent visual observance of high temperature exhaust system 200 components, thereby reducing an amplitude of an infrared heat signature of the aircraft 100. Further, one or more of the above-described air mass flow rates may be selectively controlled in response to a sensed threat condition so that relatively more cold air may be selectively be mixed with the hot air to selectively enter a stealth mode or to further reduce an infrared heat signature. Still further, the ratio of cold air mixed with hot air may be controlled to reduce a temperature of air expelled from the exhaust system 200 so that the exhaust system 200 does not scorch, burn, or warp a landing and/or take-off surface. Additionally, in this embodiment, while the surface fan 216 comprises an electric outer ring or annular motor 238, any other type of drive may be utilized to power the surface fan 216, such as, but not limited to, a belt drive, a chain drive, an engine shaft, a gear drive, a hydraulic drive, and/or any other suitable drive system. The annular motor 238 may be desirable at least insofar as it allow location of sensitive bearings, electrical windings, and other heat sensitive surface fan 216 components radially outside the hot air flow path, thereby offering increased service life. Also, the generally angularly symmetrical shape of a plurality of the exhaust system 200 components may provide increased resistance to stress and/or strain failures due to high heat and vibratory conditions as compared to other generally box-shaped and/or rectangular components of some infrared signature suppression system. While the exhaust system 200 is described herein as applied to aircraft 100, in other embodiments, the exhaust system 200 may similarly applied to any other system comprising and engine and/or a source of hot air, such as, but not limited to, an airplane, a helicopter, a land vehicle, a water vehicle, a generator, and/or any other suitable system that may comprise a source of hot air.

Referring now to FIG. 19, a curve 400 showing an Average Exhaust Gas Temperature Ratio vs. Dilution Ratio is shown. In some embodiments, the exhaust system 200 may be configured to selectively maintain a variety of hot air mass flow rate to cold air mass flow rate ratios independent of operation of the engine 132, speed of the aircraft 100, and/or orientation of the nacelle 101 relative to a ground surface. In some embodiments, the effects of the exhaust system 200 and alternative embodiments may be represented by the curve 400. Each of the Average Exhaust Gas Temperature Ratio and the Dilution Ratio are unitless values. The Average Exhaust Gas Temperature Ratio is calculated as a ratio of the mixed gas temperature (such as the hot air and cold air mixture, i.e., the mixture exiting the exhaust system 200) to the hot air (i.e., engine 132 exhaust received into the exhaust system 200). The Dilution Ratio is calculated as a ratio of the mass flow of dilution air (cold air) to the mass flow of the hot air. The curve 400 shows that in the extreme case where the hot air is not diluted or mixed with cold air, the Average Exhaust Gas Temperature Ratio is equal to 1.0, thereby causing the Dilution Ratio to equal 0.0. In another case, the Average Exhaust Gas Temperature Ratio is equal to about 0.338 and the Dilution Ratio is equal to about 3.0. In general, the curve 400 shows that an increase in cold air mass flow rate relative to hot air flow mass flow rate provides a diminishing decrease in the temperature of the mixture exhausted from the exhaust system 200. In some embodiments, the curve 400 may be applicable to the exhaust system 200 operating near sea level and standard and/or typical day ambient temperatures. It will be appreciated that the curve 400 may account for multiple hot air sources by utilizing weighted average theories to average the multiple hot air source temperatures on a weighted basis of the mass flow rate of hot air from each hot air source. Similarly, the curve 400 may account for multiple cold air sources by utilizing weighted average theories to average the multiple cold air source temperatures on a weighted basis of the mass flow rate of cold air from each cold air source.

At least one embodiment is disclosed and variations, combinations, and/or modifications of the embodiment(s) and/or features of the embodiment(s) made by a person having ordinary skill in the art are within the scope of the disclosure.

Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of managing aircraft exhaust, comprising:
   receiving hot air from an exhaust aircraft engine at a hot air mass flow rate, the aircraft engine configured to drive a rotor of the aircraft;
   providing the hot air at the hot air mass flow rate to a mixer duct of an exhaust system attached to the exhaust duct;
   receiving cold air from outside the aircraft at a cold air mass flow rate through a first duct connecting the outside of the aircraft to a distributor disposed within the mixer duct, wherein a first fan is positioned within the first duct, and wherein the first fan is separate from the rotor;
   providing the cold air at the cold air mass flow rate to the distributor; and
   mixing the hot air and the cold air within the mixer duct at a variable hot air mass now rate to cold air mass flow rate ratio, wherein the hot air mass flow rate is varied using the aircraft engine and the cold air mass flow rate is varied by controlling a speed of the first fan positioned within the first duct, wherein the variable hot air mass flow rate to cold air mass flow rate ratio is selectively maintained independent of at least one of (1) a variation in the hot air mass flow rate and (2) a variation in a translational speed of the aircraft.

2. The method of claim 1, wherein the variation in the hot air mass flow rate is at least attributable to a variation in the engine speed.

3. The method of claim 1, wherein the variation in translational speed is at least partially attributable to a variation in an orientation of the engine exhaust system relative to a ground surface.

4. The method of claim 1, wherein the mixing comprises a variably controlled rate of film cooling.

5. The method of claim 1, wherein the mixing occurs in a space free of fan components.

6. The method of claim 1, wherein the mixing comprises preventing exhausted mixed air temperatures and surface temperatures of the exhaust system components that are visible from outside the aircraft from exceeding a selected temperature.

7. The method of claim 1, wherein at least some moving components of the first fan configured to selectively vary the cold air mass flow rate are not located in a path of unmixed hot air.

8. The method of claim 1, wherein the mixing comprises passing the hot air and the cold air through a substantially annular space defined by substantially round components.

9. The method of claim 1, wherein maintaining the variable hot air mass flow rate to cold air mass flow rate ratio reduces an infrared signature of the aircraft.

10. The method of claim 1, wherein the variable hot air mass flow rate to cold air mass flow rate ratio is equal to a value selected between 0.0 and 3.0, wherein the hot air has a hot air temperature, wherein a mixture comprising the hot air and the cold air has a mixture temperature, wherein the a ratio of the mixture temperature to the hot air temperature is equal to a value selected between 1.0 to about 0.338.

11. The method of claim 10, wherein at least one of the hot air and the cold air are supplied from multiple sources.

12. The method claim 1, further comprising maintaining the variable hot air mass flow rate to cold air mass flow rate ratio using one or more controllers.

13. The method claim 12, wherein maintaining the variable hot air mass flow rate to cold air mass flow rate ratio using the one or more controllers comprises selectively controlling the cold air mass flow rate based on factors comprising at least one of air temperature, surface temperature, pressure, or air flow.

14. The method of claim 1, further comprising:
   receiving cold air from outside the aircraft at a second cold air mass flow rate through a second duct connecting the outside of the aircraft to the mixer duct, wherein a second fan is positioned within the second duct, wherein the second fan is separate from the first fan and the rotor; and
   providing the cold air at the second cold air mass flow rate to the mixer duct; and
   wherein mixing the hot air and the cold air within the mixer duct at a variable hot air mass flow rate to cold air mass flow rate ratio comprises mixing in the mixer duct the provided hot air, the cold air received through the first duct, and the cold air received through the second duct, and wherein the second cold mass flow rate is varied by controlling a speed of the second fan positioned within the second duct.

15. An exhaust system for an aircraft engine, the exhaust system comprising an exhaust duct connecting an aircraft engine to a mixer duct attached to the exhaust duct, the exhaust duct configured to provide hot air from the aircraft engine at a hot air mass flow rate to the mixer duct, wherein the hot air mass flow rate is varied by the aircraft engine, and wherein the aircraft engine is configured to drive a rotor of the aircraft;
   a first duct connecting an outside of the aircraft to a distributor disposed within the mixer duct of the exhaust system, the first duct configured to receive cold air from outside the aircraft at a cold air mass flow rate and provide the cold air at the cold air mass flow rate to the distributor;
   a first fan positioned within the first duct and separate from the rotor; and a controller configured to control a speed of the first fan positioned within the first duct to provide the cold air through the first duct at the cold air mass flow rate to the distributor; and wherein the mixer duct is configured to mix the hot air from the exhaust duct and the cold air from the first duct at a variable hot air mass flow rate to cold air mass flow rate ratio, independent of at least one of (1) a variation in the hot-air mass flow rate and (2) a variation in a translational speed of the aircraft.

16. The exhaust system of claim 15, further comprising:
a second duct connecting the outside of the aircraft to the mixer duct, the second duct being separate from the first duct, wherein the second duct is configured to receive cold air from outside the aircraft at a second cold air mass flow rate and provide the cold air at the second cold air mass flow rate to the mixer duct; and
a second fan position within the second duct and separate from the rotor, wherein the controller is configured to control a speed of the second fan positioned within the second duct to provide the cold air through the second duct at the second cold air mass flow rate to the mixer duct.

17. The exhaust system of claim 15, wherein the distributor comprises a distributor internal space at least partially bounded by a distributor wall and at least one distributor perforation through the distributor wall connecting the distributor internal space with the mixer duct.

18. The exhaust system of claim 15, wherein the exhaust system is configured for use with a tiltrotor aircraft.

* * * * *

UNITED STATES PATENT AND TRADEMARK OFFICE
CERTIFICATE OF CORRECTION

| | | |
|---|---|---|
| PATENT NO. | : 9,334,060 B2 | Page 1 of 1 |
| APPLICATION NO. | : 13/624465 | |
| DATED | : May 10, 2016 | |
| INVENTOR(S) | : Robertson et al. | |

It is certified that error appears in the above-identified patent and that said Letters Patent is hereby corrected as shown below:

In Title Page, Col. 2, (Primary Examiner), In Line 1, Delete "Ehub" and insert -- Ehud --, therefor.

In the Claims

In Column 9, In Line 37, In Claim 1, after "- -exhaust" insert -- duct of an --.

In Column 9, In Line 50, In Claim 1, delete "now" and insert -- flow --, therefor.

In Column 9, In Line 60, In Claim 2, after "least" insert -- partially --.

In Column 10, In Line 24, In Claim 10, after "between" insert -- about --.

In Column 10, In Line 27, In Claim 12, after "method" insert -- of --.

In Column 10, In Line 30, In Claim 13, after "method" insert -- of --.

In Column 10, In Line 49, In Claim 14, after "cold" insert -- air --.

In Column 11, In Line 9, In Claim 15, delete "hot-air" and insert -- hot air --, therefor.

Signed and Sealed this
Ninth Day of August, 2016

Michelle K. Lee
*Director of the United States Patent and Trademark Office*